No. 730,771. Patented June 9, 1903.

UNITED STATES PATENT OFFICE.

KARL JEDLICKA, OF BASLE, SWITZERLAND, ASSIGNOR TO THE FIRM OF SOCIETY OF CHEMICAL INDUSTRY IN BASLE, OF BASLE, SWITZERLAND.

YELLOW ACRIDIN DYE AND PROCESS OF MAKING SAME.

SPECIFICATION forming part of Letters Patent No. 730,771, dated June 9, 1903.

Application filed August 6, 1902. Serial No. 118,599. (Specimens.)

*To all whom it may concern:*

Be it known that I, KARL JEDLICKA, chemist and doctor of philosophy, a citizen of the Swiss Republic, and a resident of Basle, Switzerland, have invented new and useful Improvements in Yellow Acridin Dyes and Processes of Making Same, of which the following is a full, clear, and exact specification.

In Letters Patent No. 537,723, dated April 16, 1895, is described the transformation of the sparingly-soluble yellow acridin dyestuffs known as "acridin yellow" and "benzoflavin" into easily-soluble products of more reddish tint, the process being based on the treatment of the said amidoacridins with alkylizing agents. I have now found that the same effect—namely, the transformation into easily-soluble dyestuffs of more reddish tints—may also be produced by treating the leuco compounds corresponding to the said amidoacridins in the form in which they are obtained by heating a tetraämidoditolylmethane base with dilute acid under pressure in solution in water and in the presence of mineral acids, especially of hydrochloric acid with acetic aldehyde. The new dyestuffs thus obtained differ from the amidoacridins (acridin yellow, benzoflavin, &c.) derived from the same leuco compounds, besides being of more reddish (yellow-orange to reddish-orange) tint by being already soluble in cold water.

To manufacture these new dyestuffs, which are particularly suitable for dyeing leather, the procedure is as follows: Forty kilos of metatoluylenediamin are dissolved in fifty liters of water, together with thirty-eight kilos of hydrochloric acid of thirty per cent. strength. Twelve kilos of formaldehyde of forty per cent. strength are added, and the mixture is allowed to stand for some hours. Then a further forty kilos of concentrated hydrochloric acid are added, and the whole is heated in an autoclave for about six to eight hours at 130° to 140° centigrade in order to transform the tetraämidoditolylmethane into diamidoditolyldihydroacridin. After cooling the content of the autoclave which contains the hydrochlorate of the leuco compound corresponding to the acridin yellow in solution is decanted in an open vessel, and there is added directly to the solution while stirring ten kilos of acetic aldehyde of ninety-five per cent. strength. The mixture grows warm from itself to 60° to 70° centigrade, and the acetic alhehyde has disappeared after a few minutes. The mixture is then heated for about one hour at 80° to 90° centigrade, diluted with about two hundred liters of water, filtered, and the dyestuff salted out from the filtrate with common salt and zinc chlorid.

The dried dyestuff is a brown powder easily soluble in cold water to an orange-yellow solution. The dilute aqueous solutions of it have an intensely yellow-green fluorescence. Alkali precipitates the color base as yellow flocks. In concentrated sulfuric acid the dyestuff dissolves to a reddish-yellow solution of yellow-green fluorescence. It is difficultly soluble in cold alcohol to an orange-yellow solution having an intensely yellow-green fluorescence. It is insoluble in ether and benzene. Cotton mordanted with tannin and leather are dyed by this dyestuff clear yellow-orange tints.

If in the foregoing example diamidoditolylphenyldihydroacridin (leuco compound corresponding to the benzoflavin) is substituted for the diamidoditolyldihydroacridin, a dyestuff is obtained which has similar properties, but of a more reddish tint.

It has also been found that the same dyestuffs, easily soluble in cold water, are obtained by substituting for the leuco compounds corresponding to the amidoacridins the previously-prepared amidoacridins themselves, (acridin yellow, benzoflavin, &c.) Such amidoacridins may be directly treated in suspension in water and in the presence of a mineral acid with acetic aldehyde. In this case the production of the dyestuff is carried out as follows: One hundred kilos of the color base of acridin yellow (diamidoditolylacridin) are suspended in eight hundred liters of water containing ninety kilos of hydrochloric acid of thirty per cent. strength. Thirty-five kilos of acetic aldehyde of fifty per cent. strength (one molecular proportion) are added, and the mixture is heated with open steam to 80° to 90° centigrade. The acridin yellow gradually dissolves, and the resulting solution has a dark orange color. The solution is allowed to cool, filtered, and the new dyestuff is precipitated from the filtrate by addition of common salt and some zinc chlorid. This dyestuff is identical with the described dyestuff derived from leuco compound corresponding to acridin yellow.

What I claim is—

1. The herein-described process for the manufacture of orange dyestuffs by treating the leuco compounds corresponding to the amidoacridins with acetic aldehyde ($CH_3CHO$) in aqueous solution and in presence of a mineral acid, substantially as described.

2. As new products, the herein-described orange dyestuffs, which can be prepared by the action of acetic aldehyde on the leuco compounds corresponding to the amidoacridins and appear, in a dry state, as reddish powders, easily soluble in cold water with an orange color, insoluble in ether and benzene, soluble in concentrated sulfuric acid with a yellow color and which produce on leather and mordanted cotton orange shades, substantially as described.

3. As a new article of manufacture the herein-described orange dyestuff, which can be obtained by treating the leuco compound corresponding to acridin yellow with acetic aldehyde and appears, in dry state, as a reddish-brown powder, easily soluble in cold water, with an orange color and greenish-yellow fluorescence difficultly soluble in cold alcohol, insoluble in ether and benzene, soluble in concentrated sulfuric acid with reddish-yellow color and intensely greenish-yellow fluorescence and produces on leather and mordanted cotton clear orange shades, substantially as described.

In witness whereof I have hereunto signed my name in the presence of two subscribing witnesses.

KARL JEDLICKA.

Witnesses:
GEORGE GIFFORD,
ALBERT VICTOR GRAETER.